(12) United States Patent
Park et al.

(10) Patent No.: US 11,466,876 B2
(45) Date of Patent: Oct. 11, 2022

(54) HUMIDIFIER

(71) Applicant: Samsung Electronics Co., Ltd., Suwon-si (KR)

(72) Inventors: Juwan Park, Suwon-si (KR); Nakhyun Kim, Suwon-si (KR); Juyoung Kim, Suwon-si (KR); Changhyun Park, Suwon-si (KR); Moonsun Shin, Suwon-si (KR); Wonhee Lee, Suwon-si (KR); Hojin Lee, Suwon-si (KR); Changwoo Jung, Suwon-si (KR); Sunghyun Chun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/117,649

(22) Filed: Dec. 10, 2020

(65) Prior Publication Data

US 2021/0172628 A1 Jun. 10, 2021

(30) Foreign Application Priority Data

Dec. 10, 2019 (KR) .................. 10-2019-0163615

(51) Int. Cl.
*B01F 23/21* (2022.01)
*F24F 6/16* (2006.01)
(Continued)

(52) U.S. Cl.
CPC .............. *F24F 6/16* (2013.01); *B01F 23/215* (2022.01); *F24F 2006/008* (2013.01); *F24F 2006/046* (2013.01); *F24F 2221/12* (2013.01)

(58) Field of Classification Search
CPC ...... F24F 6/16; F24F 2006/008; B01F 23/215
See application file for complete search history.

(56) References Cited

U.S. PATENT DOCUMENTS 4,389,352 A 6/1983 Bohanon, Sr.
2018/0100666 A1* 4/2018 Park .................. F24F 11/30

FOREIGN PATENT DOCUMENTS

CN 106288095 A * 1/2017
CN 207262610 U * 4/2018
(Continued)

OTHER PUBLICATIONS

International Search Report dated Mar. 26, 2021 in International Patent Application No. PCT/KR2020/017997.

*Primary Examiner* — Robert A Hopkins
(74) *Attorney, Agent, or Firm* — Staas & Halsey LLP

(57) ABSTRACT

Disclosed herein is a humidifier including an improved structure of a water collection tank. The humidifier includes a main body, a water supply tank provided in an upper portion of the main body, a humidifying fabric arranged in an inside of the main body and disposed below the water supply tank to receive water, a fan configured to move air through the humidifying fabric, a water collection tank configured to collect water from the humidifying fabric, a pump configured to pump water from the water collection tank to the water supply tank, and a humidifier lower cover coupleable to and decoupleable from a lower end of the main body. The water collection tank includes a water collection tank top cover provided in an upper portion of the water collection tank, and a water collection tank lower cover configured to be accessible through the lower end of the main body.

23 Claims, 12 Drawing Sheets

(51) Int. Cl.
*F24F 6/04* (2006.01)
*F24F 6/00* (2006.01)

(56) References Cited

FOREIGN PATENT DOCUMENTS

| | | |
|---|---|---|
| EP | 2013544 | 10/2015 |
| JP | 5286188 | 9/2013 |
| JP | 6431602 | 11/2018 |
| KR | 20-1990-0001077 | 1/1990 |
| KR | 20-1994-0003117 | 5/1994 |
| KR | 20-0316150 Y1 | 6/2003 |
| KR | 10-2009-0087560 A | 8/2009 |
| KR | 10-1158579 | 6/2012 |
| KR | 10-2016-0056775 A | 5/2016 |
| KR | 10-2016-0140328 A | 12/2016 |
| KR | 10-2017-0077636 A | 7/2017 |
| KR | 10-2018-0005905 | 1/2018 |
| KR | 10-2018-0038155 A | 4/2018 |
| KR | 10-2019-0005640 | 1/2019 |

* cited by examiner

HUMIDIFIER

CROSS-REFERENCE TO RELATED APPLICATION(S)

This application is based on and claims priority under 35 U.S.C. § 119 to Korean Patent Application No. 10-2019-0163615, filed on Dec. 10, 2019, in the Korean Intellectual Property Office, the disclosure of which is incorporated by reference herein in its entirety.

BACKGROUND

1. Field

The disclosure relates to an air conditioner including a humidifier.

2. Description of Related Art

An air conditioner including a humidifier may maintain indoor humidity at an appropriate level. Proper humidity may prevent various respiratory diseases and create a pleasant indoor environment.

Humidifiers may be roughly classified into an evaporative type, an ultrasonic type, and a heating type on the basis of a humidification method. An evaporative humidification method is as follows. The method may include a structure in which water is continuously supplied to a humidifying fabric of a humidifier. In addition, the method may include a structure in which air around the humidifier is forcibly passed through the humidifying fabric, which is moistened, by using an air circulation device, such as a fan.

The evaporative type humidifier may include a water collection tank in which water is collected. Water that is stored in the water collection tank for a long time may cause difficulties, such as reproduction of microorganisms or odor. Further, there is inconvenience, such as dissembling all air conditioner including a humidifier for cleaning and repairing the water collection tank.

SUMMARY

In accordance with an aspect of the disclosure, a humidifier includes a main body, a water supply tank provided in an upper portion of the main body, a humidifying fabric arranged in an inside of the main body and disposed below the water supply tank to receive water, a fan configured to move air around the main body to pass through the humidifying fabric, a water collection tank configured to collect water falling from the humidifying fabric, a pump configured to pump water from the water collection tank to the water supply tank, and a humidifier lower cover provided at a lower end of the main body and configured to be detachable from the main body. The water collection tank includes a water collection tank top cover provided in an upper portion of the water collection tank, and a water collection tank lower cover configured to be detachable from the water collection tank top cover by passing through the lower end of the main body.

The main body may include a lower frame provided at the lower end of the main body and including an opening, a rear cover extending upward along an edge of the lower frame and configured to cover a portion of opposite side surfaces and a rear surface of the humidifier, and a sub frame located below the lower frame and configured to be coupled to the lower frame.

The sub frame may include an external flange configured to be correspondingly coupled to the rear cover, an inner flange formed more inside than the outer flange, and a bottom portion configured to connect the inner flange to the outer flange.

A fastening groove may be formed in the lower frame, and the inner flange may include a hook configured to be correspondingly hooked to the fastening groove.

The humidifier lower cover may include a humidifier lower cover fastening portion, and the lower frame may include a lower frame fastening portion at a position corresponding to the humidifier lower cover fastening portion, and the humidifier lower cover fastening portion and the lower frame fastening portion may be fastened to each other through a fastening member.

The water collection tank may further include a drain groove provided in a bottom portion of the water collection tank lower cover, and a drain portion connected to the drain groove.

The water collection tank lower cover may further include an inclined portion formed such that the bottom portion is inclined toward the drain groove.

The drain portion may further include a drain cylinder configured to allow the drain groove to communicate with an outside of the water collection tank, and a drain tube connected to the drain cylinder.

The rear cover may include a rear cover recess provided in an area adjacent to the water collection tank and recessed toward a front of the humidifier.

The drain tube may be bent and seated in the rear cover recess.

The inner flange may include a drain tube through hole formed at a position lower than the bottom portion of the water collection tank.

An upper end of the inner flange and an upper end of the outer flange may come into contact with the lower frame as the sub frame and the lower frame are fastened to each other. The drain tube through hole may be provided in a position corresponding to the rear cover recess of the humidifier lower cover.

The rear cover may further include a fixing flange protruding from the rear cover recess and configured to correspond to a diameter of the drain tube to allow the drain tube to be fitted and fixed.

The drain portion may further include a drain cap configured to be fitted and coupled to a drain port of the drain tube.

The drain portion may include an elbow removably connected to the drain cylinder and the drain tube, respectively, and configured to change a flow direction of water flowing out from the drain cylinder.

The humidifier may further include a recess cover configured to cover the rear cover recess and provided to form the rear cover and an exterior of the humidifier.

The humidifier lower cover may be provided to correspond to a shape of the opening of the lower frame, and the humidifier lower cover may include a lower cover recess recessed downward of the humidifier to accommodate the drain tube.

The humidifier lower cover may further include an opening provided on one side of the lower cover recess and opened toward the drain tube through hole, and a guide flange provided to protrude from the lower cover recess and configured to guide the drain tube to pass through the drain tube through hole.

In accordance with another aspect of the disclosure, a humidifier includes a water supply tank, a humidifying fabric configured to receive water from the water supply tank, a fan configured to forcedly move air to pass through the humidifying fabric, a water collection tank configured to collect water falling from the humidifying fabric, a pump configured to pump water from the water collection tank to the water supply tank; and a humidifier lower cover configured to be detachable from a lower end of the water collection tank and configured to expose a bottom surface of the water collection tank.

The water collection tank may include a drain groove provided with a drain cylinder configured to allow the water collection tank to communicate with an outside of the water collection tank, and a drain tube connected to the drain cylinder to discharge water to the outside of the water collection tank.

The humidifier may further include a lower frame provided below the water collection tank and including an opening, a rear cover extending upward along an edge of the lower frame and configured to cover a portion of opposite side surfaces and a rear surface of the humidifier, and a sub frame located below the lower frame and configured to be coupled to the lower frame. The humidifier lower cover may be detachable from the lower frame and formed to have a shape corresponding to the opening.

The rear cover may include a rear cover recess provided in an area adjacent to the water collection tank and recessed toward a front of the humidifier, The drain tube may be bent and seated in the rear cover recess.

The sub frame may include an external flange configured to be correspondingly coupled to the rear frame, an inner flange formed more inside than the outer flange; and a bottom portion configured to connect the inner flange to the outer flange.

The inner flange may include a drain tube through hole formed at a position lower than the bottom portion of the water collection tank.

An upper end of the inner flange and an upper end of the outer flange may come into contact with the lower frame as the sub frame and the lower frame are fastened to each other.

The drain tube through hole may be provided in a position corresponding to the rear cover recess of the humidifier lower cover.

Additional aspects of the disclosure will be set forth in part in the description which follows and, in part, will be obvious from the description, or may be learned by practice of the disclosure.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Hereinafter embodiments of the disclosure will be described in detail with reference to the accompanying drawings.

Therefore, it is an aspect of the disclosure to provide a humidifier including an improved structure capable of cleaning and repairing a water collection tank without disassembling all the humidifier.

It is another aspect of the disclosure to provide a humidifier including an improved structure capable of effectively removing residual water of a water collection tank, other than a method of using a pump.

Figure 1:
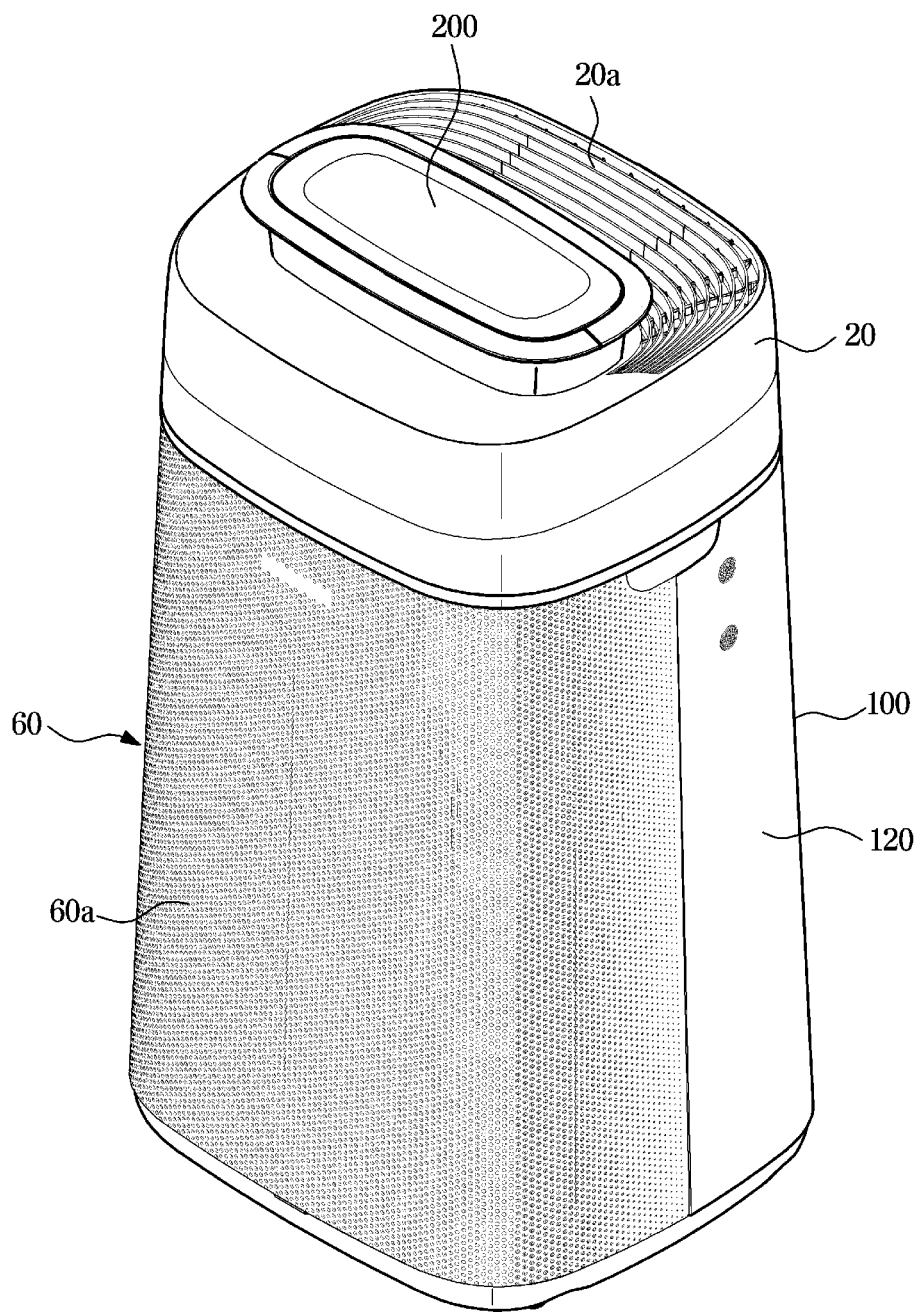
FIG. 1 is a perspective view illustrating an appearance of a humidifier according to an embodiment of the disclosure.
Figure 2:
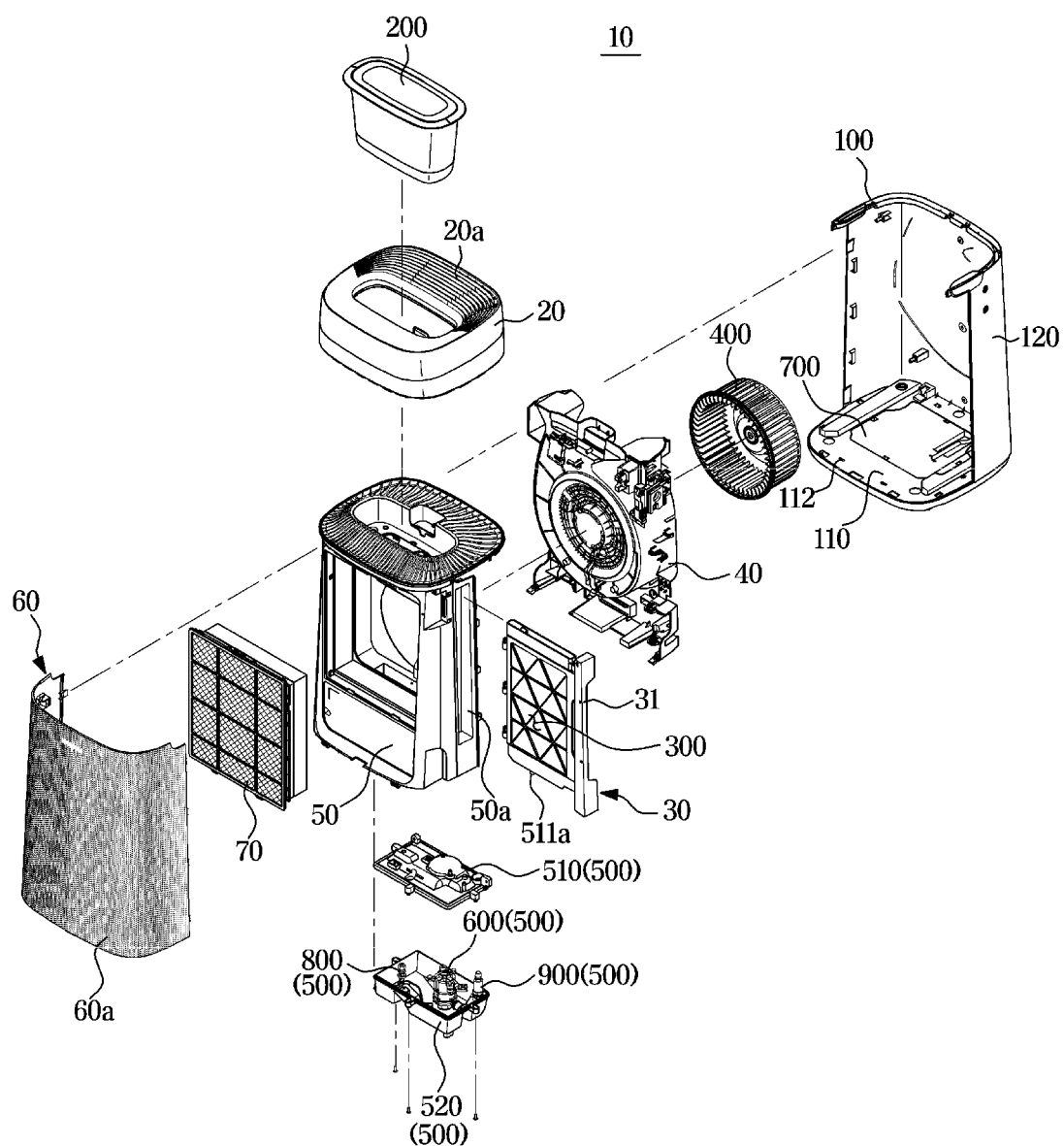
FIG. 2 is an exploded perspective view of the humidifier according to an embodiment of the disclosure.

A circulation path of water and a flow direction of air will be schematically described with reference to FIGS. 1 and 2. FIG. 1 is a perspective view illustrating an appearance of a humidifier 10 according to an embodiment of the disclosure. FIG. 2 is an exploded perspective view of the humidifier 10 according to an embodiment of the disclosure.

According to an embodiment of the disclosure, the humidifier 10 may include a water supply tank 200 provided in an upper portion of the humidifier 10, a humidifying fabric unit 30 provided in an inside of the humidifier 10 and configured to receive water from the water supply tank 200, a fan 400 configured to move air around the humidifier 10 to pass through the humidifying fabric unit 30, a water collection tank 500 configured to collect water falling from the humidifying fabric unit 30, and a pump 600 configured to pump water from the water collection tank 500 to the water supply tank 200.

A process of circulating water in the humidifier 10 is schematically as follows.

A user may install the water supply tank 200, in which a certain amount of water is stored, to the upper portion of the humidifier 10 prior to an operation of the humidifier. Sequentially, water may be supplied to the humidifying fabric unit 30 by a supply pipe (not shown) connected between the water supply tank 200 and the humidifying fabric unit 30 by a solenoid valve (not shown). The water supplied to the humidifying fabric unit 30 flows down along the humidifying fabric unit 30 by gravity while wetting the humidifying fabric 300 inside the humidifying fabric unit 30.

The fan 400 disposed inside the humidifier 10 and adjacent to the humidifying fabric unit 30 may be operated by a user or by an automatic control of the humidifier 10, thereby moving air around the humidifier 10. Particularly, the fan 400 may move air around the humidifier 10 to pass through the humidifying fabric 300. Air passing through the humidifying fabric 300 may contain moisture. Thereafter, air including moisture may be discharged to the outside of the humidifier 10 by continuous operation of the fan 400. Accordingly, it is possible to increase and control the humidity of the indoor environment in which the user is placed.

A certain amount of water in the wet humidifying fabric 300 may be vaporized by the operation of the fan 400 and may be used to control the humidity of the indoor environment, but remaining water may not be vaporized and continue to flow downward by gravity. Sequentially, the water falls from a lower end of the humidifying fabric 300 and is collected in the water collection tank 500.

The water collected in the water collection tank 500 may be pumped by the pump 600 located inside the water collection tank 500 and then be circulated back to the water supply tank 200 through a circulation pipe 900.

At this time, most of the water collected in the water collection tank 500 is pumped and does not remain, but some residual water may be generated due to a malfunction or failure of the pump 600 or clogging of the circulation pipe (not shown).

A configuration included in the humidifier 10 according to an embodiment of the disclosure will be described in detail with reference to FIGS. 1 and 2.

The humidifier 10 may include a main frame 50, a water supply tank mounting portion 20 coupled to an upper end of the main frame 50, and the humidifying fabric unit 30 to which the humidifying fabric 300 is mounted. A filter 70 may be provided to the humidifier 10. A front case 60 may be coupled to the front of the main frame 50, and a rear case 100 on which the main frame 50 is mounted may be provided at the rear of the main frame 50. Between the main frame 50 and the rear case 100, the fan 400 configured to move air around the humidifier 10 to pass through the humidifying fabric unit 30 may be disposed, and a fan frame 40 may be provided to arrange the fan.

An air inlet 60a may be formed in the front case 60 to allow dry air in the room to flow into the humidifier 10. The air inlet 60a may be formed in the form of a plurality of hollows over the entire area of the front case 60. The air inlet 60a may be formed in a mesh shape for the aesthetic of the overall appearance of the humidifier and for effectively guiding the outside air into the inside.

An air outlet 20a, through which air, which contains moisture by passing through the humidifying fabric unit 30 of the humidifier 10, is discharged, may be formed on an upper surface of the water supply tank mounting portion 20. As shown in FIG. 2, on some areas of the upper surface of the water supply tank mounting portion 20, the air outlet may be provided in a structure including a plurality of blades. Alternatively, the air outlet may be provided over the entire area of the upper surface of the water supply tank mounting portion 20, as the plurality of blades. Alternatively, the air outlet may be formed in a shape of a plurality of hollows or a mesh shape for unify the design between the water supply tank mounting portion 20 and the front case 60.

A flow of air, in which the outside air of the humidifier 10 passes through the air inlet 60a of the front case 60 and passes through the humidifying fabric of the humidifying fabric unit 30 and then is discharged to the air outlet 20a of the water supply tank mounting portion 20, may be formed. The flow of air may be generated by the fan 400.

As shown in FIG. 2, a centrifugal fan 400 may be used for the flow of air according to an embodiment of the disclosure. Particularly, a sirocco fan 400 having less noise among centrifugal fans may be used. However, the type of fan is not limited to the centrifugal fan, and a side-flow fan may be used according to the structure of the humidifier as long as being capable of moving the air around the humidifier 10 to pass through the humidifying fabric unit 30.

Hereinafter a detailed structure of the humidifier 10 for circulation of water will be described in detail.

Figure 3:
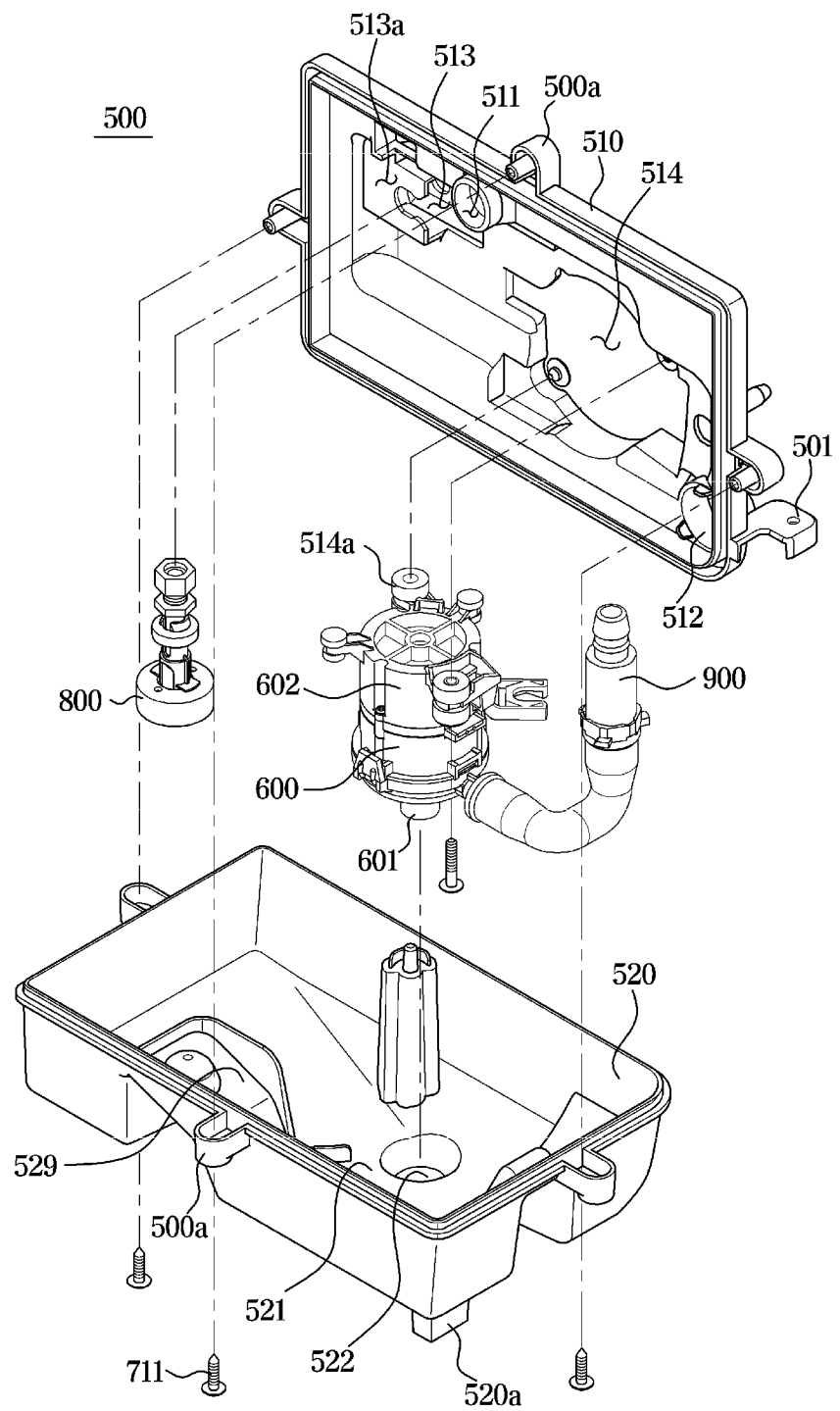
FIG. 3 is an exploded perspective view of a water collection tank and components disposed in the water collection tank according to an embodiment of the disclosure.

Referring to FIGS. 2 and 3, an outlet (not shown) for supplying water to the humidifying fabric unit 30, and an inlet (not shown), to which the pumped water is introduced from the water collection tank 500, may be formed on the water supply tank 200.

The outlet (not shown) of the water supply tank 200 may supply water to the humidifying fabric unit 30 through a water supply pipe (not shown) extending from the water supply tank mounting portion 20. A solenoid valve (not shown) may be installed in the water supply pipe (not shown) to control the supply of water to the humidifying fabric unit 30. The solenoid valve (not shown) may be opened while the humidifier 10 performs a humidification operation to supply water to the humidifying fabric unit 30. In addition, a signal, which indicates that water is collected in the water collection tank 500 and the water collection tank 500 is filled with water, or other various error signals may be received by a controller (not shown) from a water level sensor 800 disposed in the water collection tank 500. The solenoid valve (not shown) may be closed by the controller (not shown) to prevent the water from supplying to the humidifying fabric unit 30.

The inlet (not shown) of the water supply tank 200 may be in communication with the pump 600 through the circulation pipe 900. An on-off valve (not shown) configured to open and close the outlet (not shown) and the inlet (not shown) may be disposed at the outlet (not shown) and the inlet (not shown) of the water supply tank 200, respectively. The on-off valve (not shown) may open the outlet (not shown) and the inlet (not shown) in response to mounting the water supply tank 200 to the water supply tank mounting portion 20, and the on-off valve (not shown) may close the outlet (not shown) and the inlet (not shown) in response to separating the water supply tank 200 from the water supply tank mounting portion 20.

The humidifying fabric unit 30 may be mounted to the inside of the main frame 50 through a slot 50a formed on one side of the main frame 50. The humidifying fabric unit 30 includes the humidifying fabric 300 configured to absorb water supplied from the water supply tank 200, a support frame 31 configured to support the humidifying fabric 300, a water distributor (not shown) configured to evenly distribute water to the humidifying fabric 300, and a drain portion 511a configured to discharge water that is neither vaporized nor absorbed by the humidifying fabric 300 and thus flows down.

The humidifying fabric 300 may include a material, such as fiber or paper, and may have a substantially rectangular shape. The humidifying fabric 300 may receive water, which is evenly distributed, from the water distributor (not shown) provided on an upper end of the humidifying fabric 300. The humidifying fabric 300 may hold the distributed water, and may supply moisture to the air that is forced to pass through the humidifying fabric 300 by the fan 400. In addition, the humidifying fabric 300 may perform a filtering function to filter out fine dust or impurities contained in the forced air.

The water distributor (not shown) may be provided separately from the support frame 31 and may be coupled to the upper end of the support frame 31. Alternatively, the water distributor (not shown) may be integrally formed on the upper side of the support frame 31. At a lower end of the water distributor (not shown), a plurality of drain holes (not shown) may be formed at regular intervals along a width direction of the support frame 31. Water flowing out from the plurality of drain holes (not shown) may be supplied to an upper portion of the humidifying fabric 300 and then flow down along the humidifying fabric 300 and the support frame 31. Accordingly, water may be evenly absorbed over the entire area of the humidifying fabric 300 provided in a substantially rectangular shape. Because the humidifying fabric 300 holds the water with the entire area not a specific area, vaporization may occur effectively and the humidification efficiency of the humidifier 10 may be increased.

The drain portion 511a may be integrally formed on the lower side of the support frame 31. The drain portion 511a may be configured to collect water, which is neither vaporized nor absorbed by the humidifying fabric 300 and then flows down, from the humidifying fabric 300 and then discharge the collected water to the water collection tank 500.

The water collection tank 500 may be disposed under the humidifying fabric unit 30 (refer to FIG. 2). The water collection tank 500 may collect water, which is neither vaporized nor absorbed by the humidifying fabric 300 and then flows down, through the drain portion 511a. The water collected in the water collection tank 500 may be pumped back to the water supply tank 200 by the pump 600, and the overall circulation of water in the humidifier 10 may be performed by this structure.

Hereinafter the water collection tank 500 and an arrangement structure in the rear case 100 of the water collection tank 500 will be described in detail with reference to FIGS. 3 to 7. For convenience of description, the rear case 100 is referred to as the main body 100 in the following description.

Figure 4:
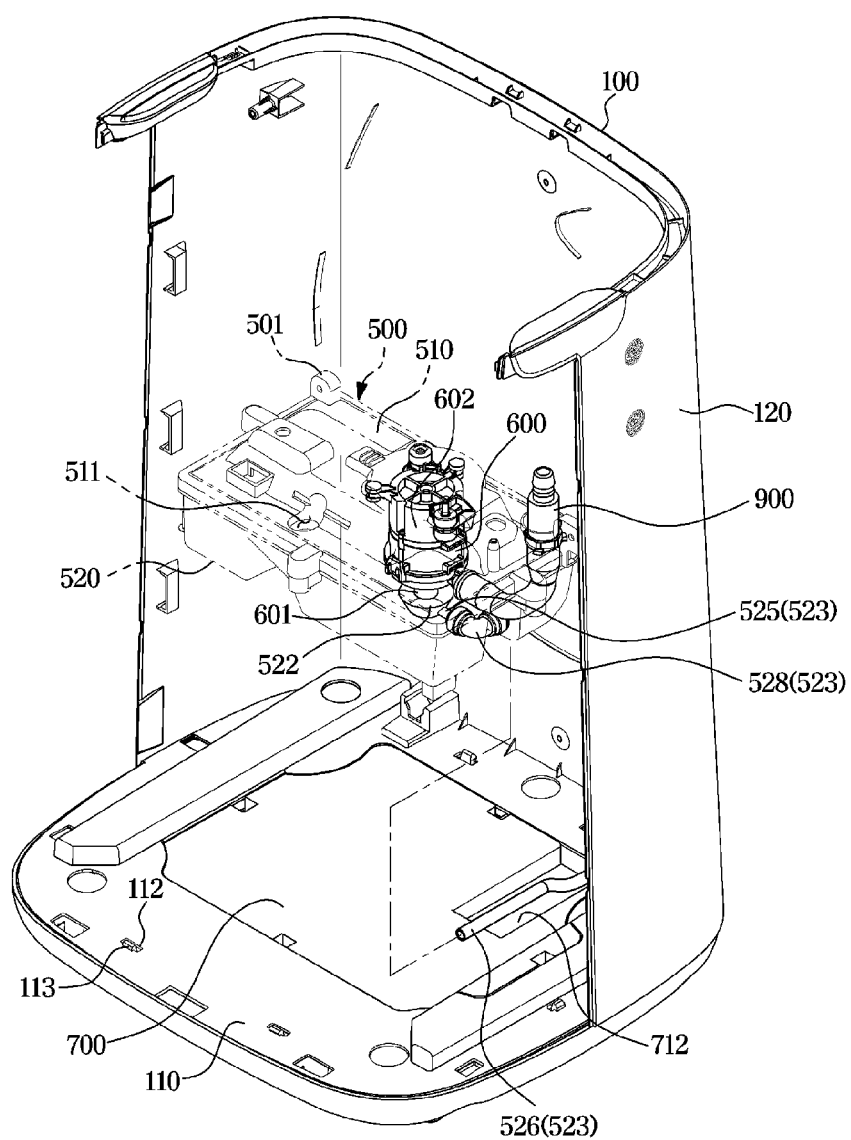
FIG. 4 is a view illustrating an arrangement relationship among a main body, the water collection tank and a drain tube of the humidifier according to an embodiment of the disclosure.
Figure 5:
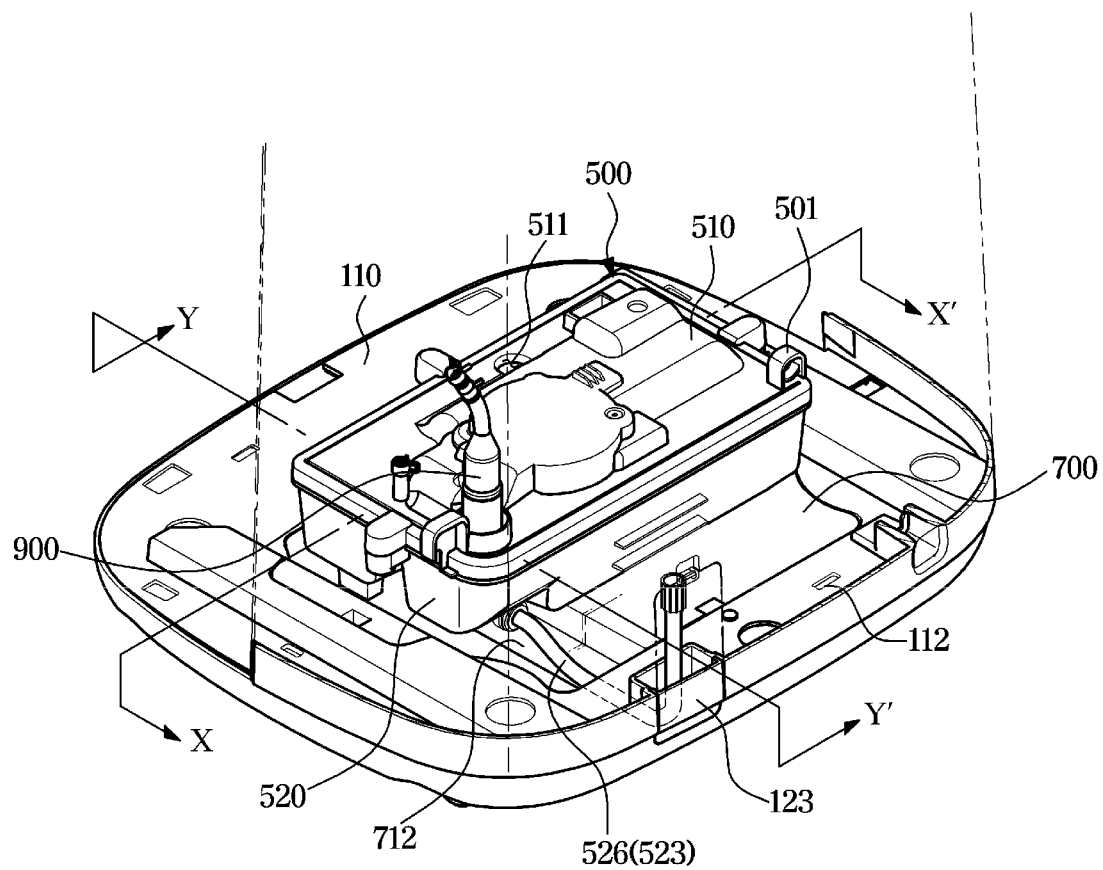
FIG. 5 is a view illustrating a state in which the water collection tank of FIG. 4 is installed in the main body when viewed from a different direction.
Figure 6:
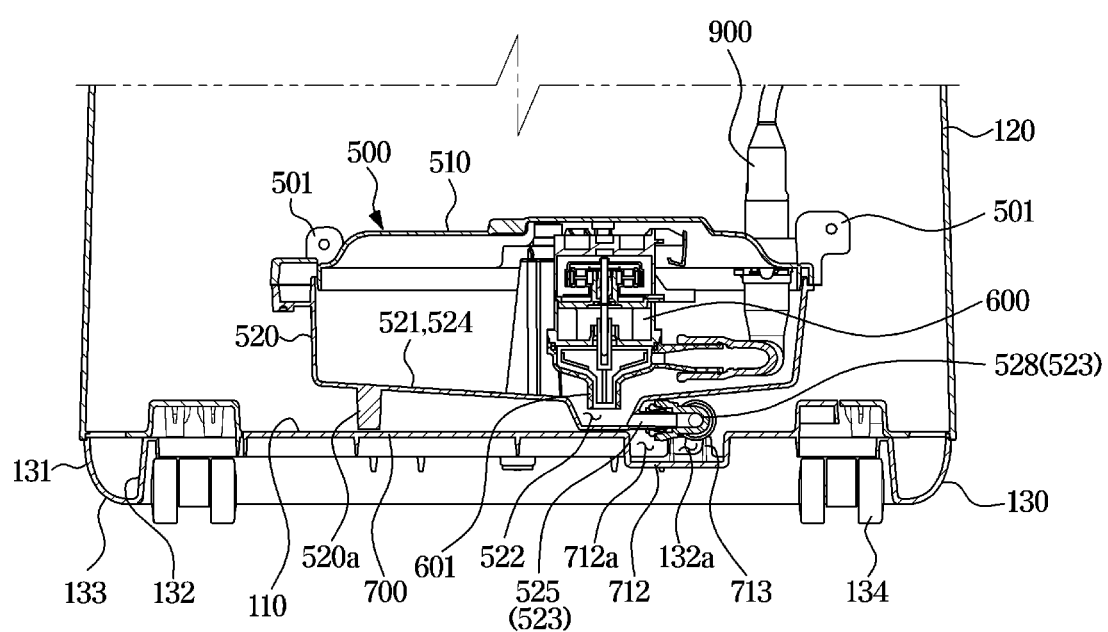
FIG. 6 is a cross-sectional view taken along a line X-X' of FIG. 5.
Figure 7:
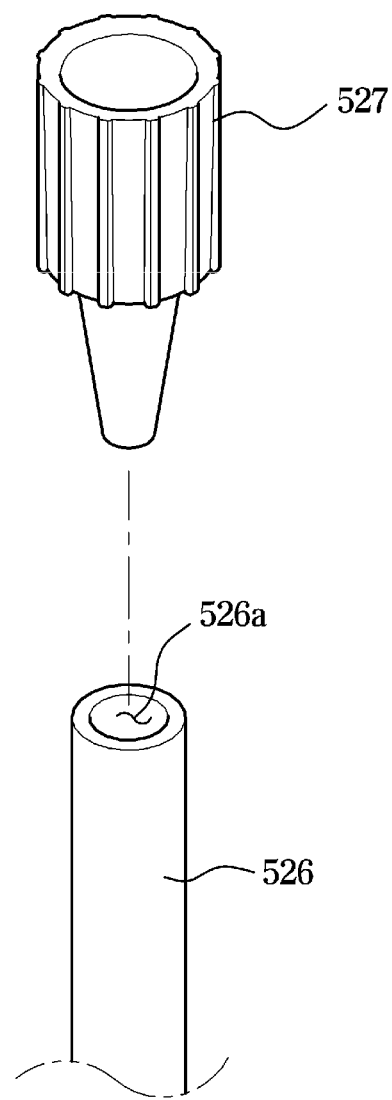
FIG. 7 is a view illustrating a drain port of the drain tube and a drain cap coupled to the drain port of the humidifier according to an embodiment of the disclosure.

FIG. 3 is an exploded perspective view of the water collection tank 500 and components disposed in the water collection tank 500 according to an embodiment of the disclosure. FIG. 4 is a view illustrating an arrangement relationship among the main body 100, the water collection tank 500 and a drain tube 526 of the humidifier 10 according to an embodiment of the disclosure. FIG. 5 is a view illustrating a state in which the water collection tank 500 of FIG. 4 is installed in the main body 100 when viewed from a different direction. FIG. 6 is a cross-sectional view taken along a line X-X' of FIG. 5. FIG. 7 is a view illustrating a drain port 526a of the drain tube 526 of the humidifier and a drain cap 527 coupled to the drain port 526a according to an embodiment of the disclosure.

Referring to FIG. 3, the water collection tank 500 may include a water collection tank top cover 510 and a water collection tank lower cover 520.

Hereinafter the water collection tank lower cover 520 will be described with reference to FIGS. 3 to 6. The water collection tank lower cover 520 is located below the water collection tank top cover 510 and configured to be coupled to the water collection tank top cover 510. A drain guide 529 may protrude from a bottom portion 521 of the water collection tank lower cover 520 by a predetermined height to correspond to a water collection hole 511 of the water collection tank top cover 510. That is, one end of the drain guide 529 is provided adjacent to the water collection hole 511 of the water collection tank top cover 510. Water flowing from the water collection hole 511 may flow down to the bottom portion 521 of the water collection tank lower cover 520 along a slope between one end of the drain guide 529 and the other end of the drain guide 529. By using the structure, it is possible to reduce noise that may be generated during water falls and is stored in the water collection tank 500.

In order to minimize residual water in the water collection tank 500 and increase the circulation efficiency of the pump 600, the bottom portion 521 of the water collection tank lower cover 520 may be formed to be inclined. Particularly, a drain groove 522 may be provided in the bottom portion 521 of the water collection tank lower cover 520. The water collection tank lower cover 520 may include an inclined portion 524 in which the bottom portion 521 is inclined toward the drain groove 522. At a lowest position of the bottom portion 521, the drain groove 522 may be formed to be concave toward the lower side of the humidifier 10. A pump inlet 601 of the pump 600 may be disposed inside the drain groove 522. As a separation distance between the pump inlet 601 and the drain groove 522 becomes shorter (refer to FIG. 6), an amount of water remaining in the water collection tank 500 may decrease. By using the structure, it is possible to primarily minimize the amount of remaining water in the water collection tank 500 and it is possible to prevent a difficulty, such as reproduction of microorganisms and odor that may occur due to water that is stored in the water collection tank 500 for a long time.

Hereinafter the water collection tank top cover 510 will be described with reference to FIG. 3. Referring to FIG. 3, a coupling structure to which the pump 600, a water level sensor 800, and the circulation pipe 900 are coupled may be provided on the water collection tank top cover 510. Particularly, a circulation pipe through-hole 512, a water level sensor seating portion 513, and a pump seating portion 514 may be provided in the water collection tank top cover 510.

It may be inconvenience to disassemble the front case 60 and the main frame 50 of the humidifier to clean and repair the water collection tank 500. To reduce the inconvenience, a separate detachable humidifier lower cover 700 (refer to FIG. 4) may be provided at the lower end of the humidifier 10, that is, at the lower end of the water collection tank 500. That is, for cleaning and repairing the water collection tank 500, the water collection tank lower cover 520 may be disassembled and then separated from the water collection tank top cover 510 after separating the humidifier lower cover 700 (refer to FIGS. 11 and 12).

In a state in which the pump 600, the water level sensor 800, and the circulation pipe 900 are fixed to the water collection tank lower cover 520, it may be difficult to separate the water collection tank lower cover 520 from the water collection tank top cover 510. In order to ease this difficulty, the water collection tank top cover 510 may include a fastening structure to which the pump 600, the water level sensor 800 and the circulation pipe 900 are coupled. Particularly, referring to FIG. 3, for the fastening structure to which the pump 600, the water level sensor 800, and the circulation pipe 900 are coupled, the water collection tank top cover 510 may include the circulation pipe through-hole 512, the water level sensor seating portion 513, and the pump seating portion 514.

The water level sensor seating portion 513 and the pump seating portion 514 may be formed to be recessed from the water collection tank top cover 510 toward the upper side of the humidifier 10. The pump 600 and the water level sensor 800 may be stably coupled to the water collection tank top cover 510 through such a recessed structure, that is, a recess.

As shown in FIG. 3, in the water collection tank top cover 510, a water level sensor coupling flange 513a may be additionally configured to allow the water level sensor to be stably coupled to the water level sensor seating portion 513. A coupling groove formed in a body of the water level sensor may be fitted and coupled to the water level sensor coupling flange 513a, thereby being disposed in the water level sensor seating portion 513.

As shown in FIG. 3, a pump fastening groove 514a may be formed in the pump seating portion 514 formed in the water collection tank top cover 510. The pump 600 may be coupled to the water collection tank top cover 510 through a separate pump frame 602 as shown in FIG. 3. The pump 600 may be coupled to the pump frame 602, and the pump frame 602 may be coupled to the pump seating portion 514 of the water collection tank top cover 510. The pump frame 602 and the pump seating portion 514 of the water collection tank top cover 510 may include the pump fastening groove 514a at corresponding positions. After the pump frame 602 is mounted on the pump seating portion 514 of the water collection tank top cover 510, each of the pump fastening grooves 514a may be coupled to each other through a separate fastening member.

The circulation pipe 900 connected to one side of the pump 600 may be configured to supply the water pumped by the pump 600 to the water supply tank 200. Like the pump 600, the circulation pipe 900 may be coupled to the water collection tank top cover 510. The circulation pipe through hole 512 may be formed in the water collection tank top cover 510, and the circulation pipe 900 may pass through the circulation pipe through hole 512 and then supply water to the upper portion of the humidifier 10 (refer to FIG. 2) in which the water supply tank 200 is placed.

As shown in FIG. 3, a water collection tank cover fastening groove 501 may be formed in the water collection tank top cover 510. The water collection tank top cover 510 may be fixed to the fan frame 40 (refer to FIG. 2) or the main frame 50 (refer to FIG. 2) through the water collection tank cover fastening groove 501. Particularly, in the fan frame 40 (refer to FIG. 2) or the main frame 50 (refer to FIG. 2), a fixing groove (not shown) may be provided at a position corresponding to the water collection tank cover fastening groove 501 formed on the water collection tank top cover 510. The fixing groove (not shown) and the water collection tank cover fastening groove 501 may be coupled to each other through a separate fastening member. Alternatively, various fastening structures configured to couple the fan frame 40 (refer to FIG. 2) or the main frame 50 (refer to FIG. 2) to the water collection tank top cover 510 may be applied. That is, a structure in which, the water collection tank top cover 510, to which the pump 600, the water level sensor 800, and the circulation pipe 900 are fixed, is fixed to the fan frame 40 (refer to FIG. 2) or the main frame 50 (refer to FIG. 2), may be formed. By using the structure, for cleaning and repairing the water collection tank 500, it is possible to release the coupling between the water collection tank top cover 510 and the water collection tank lower cover 520 so as to separate the water collection tank lower cover 520 from the water collection tank top cover 510 after separating the humidifier lower cover 700.

A coupling structure of the water collection tank top cover 510 and the water collection tank lower cover 520 will be described with reference to FIGS. 3 to 6.

The water collection tank top cover 510 may be disposed above the water collection tank lower cover 520. The water collection tank lower cover 520 may be coupled to the water collection tank top cover 510. The water collection tank lower cover 520 may employ a fastening structure, such as bolts and nuts to be coupled to the water collection tank top cover 510. Alternatively, as shown in FIG. 3, a method in which, the water collection tank cover fastening grooves 500a is respectively formed at corresponding positions of the water collection tank lower cover 520 and the water collection tank top cover 510 and then the water collection tank lower cover 520 is coupled to the water collection tank top cover 510 through a separate fastening member 711, may be applicable. Alternatively, various fastening structure configured to couple the water collection tank lower cover 520 to the water collection tank top cover 510 will be applicable.

A structure in which the water collection tank 500 is supported by the humidifier lower cover 700 will be described with reference to FIGS. 3 and 6.

Because the drain groove 522 is formed at the lowest position of the bottom portion 521 to be concave toward the lower side of the humidifier 10, the drain groove 522 have a structure protruding toward the humidifier lower cover 700 when viewed from the outside of the water collection tank 500. The drain groove 522 may come into contact with the humidifier lower cover 700 together with a water collection tank lower cover support 520a. As will be described later, because the water collection tank top cover 510 is formed in a structure 501 (refer to FIGS. 3 and 6) that is fixed to the fan frame 40 (refer to FIG. 2) or the main frame 50 (refer to FIG. 2), the water collection tank 500 may be firstly supported, and because the water collection tank lower cover support 520a and the protrusion structure (refer to FIG. 6) of the drain groove 522 come into contact with the humidifier lower cover 700, the water collection tank 500 may be secondly supported.

The drain groove 522 and a drain portion 523, according to an embodiment of the disclosure will be described with reference to FIGS. 3 to 7.

The water collection tank 500 may further include the drain groove 522 provided in the bottom portion 521 of the water collection tank lower cover 520 and the drain portion 523 connected to the drain groove 522.

The drain groove 522 may be formed at the lowest position of the bottom portion 521 to be concave toward the lower side of the humidifier 10. Particularly, the drain groove 522 may have a funnel shape in which a drain hole is blocked. The pump inlet 601 of the pump 600 may be disposed in the inside of the drain groove 522.

Residual water in the drain groove 522 may be removed in a manner of being moved to the water supply tank 200 by the pump 600. However, the residual water may be inevitably generated due to a separation distance between the pump inlet 601 and the drain groove 522, clogging of the circulation pipe 900, a malfunction of the controller (not shown) and the pump 600, and the aging of the pump 600.

To ease this difficulty, the water collection tank 500 may further include the drain portion 523 connected to the drain groove 522. The drain portion 523 may include a drain cylinder 525 configured to allow the drain groove 522 to communicate with the outside of the water collection tank 500, and the drain tube 526 connected to the drain cylinder. The drain cylinder 525 may be formed of the same material as the drain groove 522, that is, the water collection tank lower cover 520. The drain tube 526 may be formed of a silicone or rubber material having elasticity for the ease of drainage action of the user.

Referring to FIGS. 3 and 6, the drain portion 523 may further include an elbow 528. The elbows 528 may be removably connected to the drain cylinder 525 and the drain tube 526, respectively, and may be configured to change a flow direction of the water flowing out from the drain cylinder 525. The elbow 528 may be configured to be detachable in each of the drain cylinder 525 and the drain tube 526. However, in order to prevent leakage, the elbow 528 may be inseparably and firmly fixed to the drain tube 526, which has a relatively high deformability, through an adhesive or heat-sealing method, but the elbow 528 may be detachably connected to the drain cylinder 525. Because the drain portion 523 allows the drain groove 522 to communicate with the outside of the water collection tank 500, the drain cylinder 525 and the drain tube 526, and the elbow 528 may be arranged in a space between the water collection tank lower cover 520 and the humidifier lower cover 700.

Figure 8:
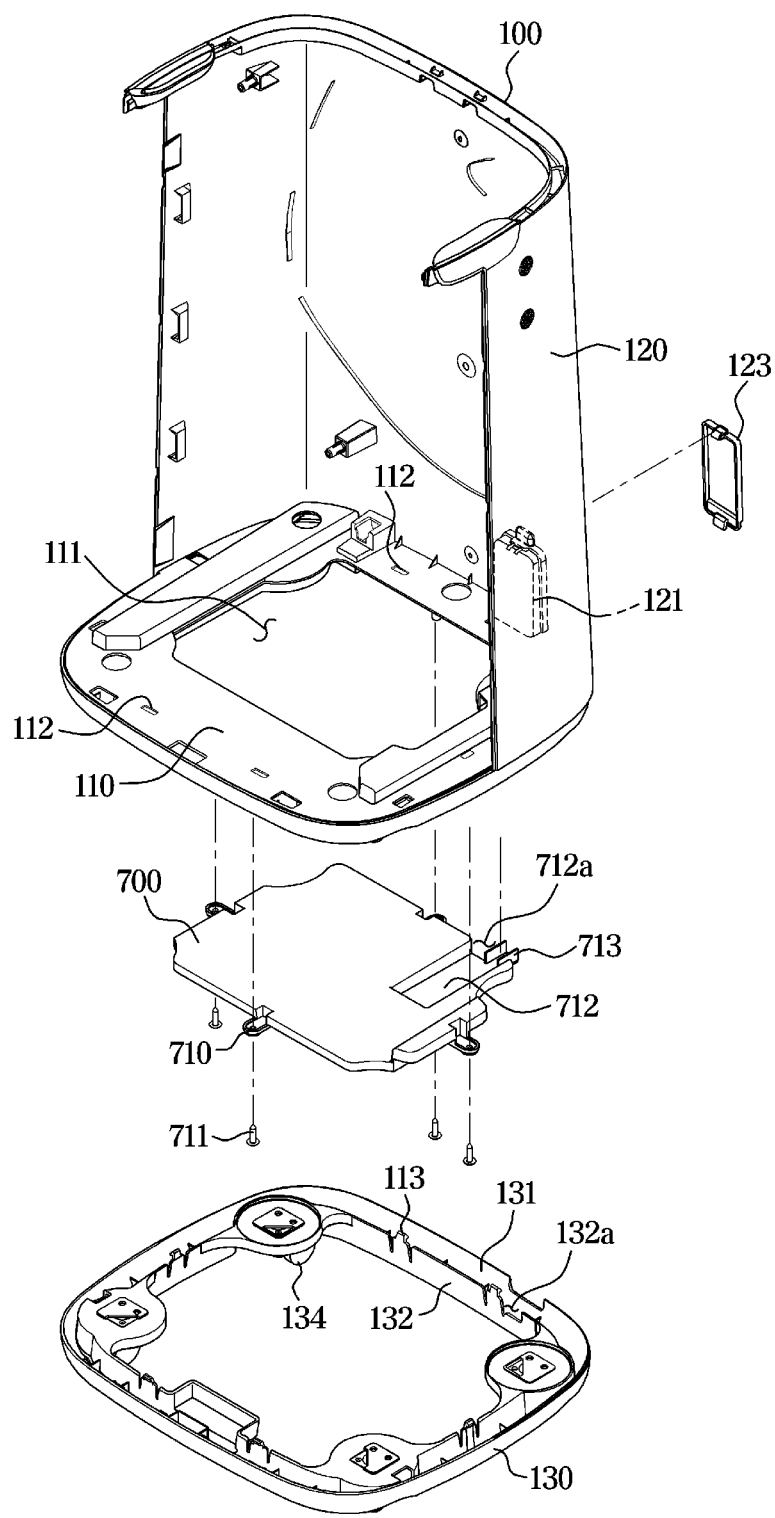
FIG. 8 is a view illustrating a coupling relationship among the main body, a humidifier lower cover, and a humidifier rear cover recess of the humidifier according to an embodiment of the disclosure.
Figure 9:
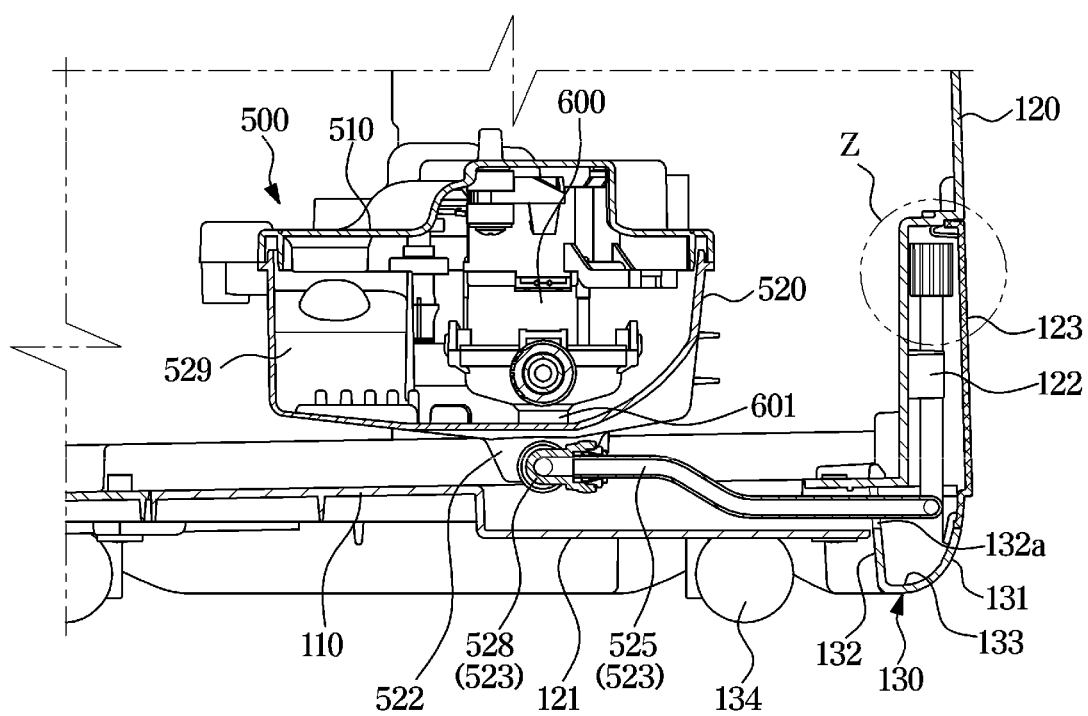
FIG. 9 is a cross-sectional view taken along a line Y-Y' of FIG. 5.

As shown in FIG. 7, the drain portion 523 may further include the drain cap 527 fitted and coupled to the drain port 526a of the drain tube 526. Referring to FIG. 9, in a normal use state of the humidifier 10, it can be seen that a height from the ground to a water surface of water collected in the water collection tank 500 is less than a height from the ground to the highest end of the drain tube 526 perpendicular to the ground. Therefore, it can be seen that the water does not flow back because the same atmospheric pressure is applied to the water collection tank 500 and the ends of the drain tube 526. However, in a situation where too much residual water is collected in the water collection tank as an unusual situation, such as a malfunction of the pump, which is not a situation where a user does not remove the residual water using the drain tube 526, water may overflow into the drain tube 526. In order to prevent such a situation, the drain cap 527 fitted and coupled to the drain port 526a of the drain tube 526 may be provided. The drain cap 527 may include a gripping portion having a cylindrical shape and an insertion portion protruding in a substantially triangular pyramid shape from one end of the gripping portion to be easily fitted into the drain port 526a. Hereinafter the main body 100 provided below the water collection tank 500 will be described in detail with reference to FIGS. 8 to 9. FIG. 8 is a view illustrating a coupling relationship among the main body 100, the humidifier lower cover 700, and a humidifier rear cover recess 121 of the humidifier according to an embodiment of the disclosure. FIG. 9 is a cross-sectional view taken along a line Y-Y' of FIG. 5.

Referring to FIG. 8, the main body 100 may include a lower frame 110, a rear cover 120, and a sub frame 130.

The lower frame 110 may include an opening 111 at a lower end of the lower frame 110. After removing the humidifier lower cover 700, the water collection tank lower cover 520 may be separated through the opening 111 for cleaning and repairing the water collection tank 500. The main frame 50 (refer to FIG. 2) and the fan frame 40 (refer to FIG. 2) may be disposed above the lower frame 110.

The rear cover 120 may extend upward along an edge of the lower frame 110, and may be formed to cover portions of opposite side surfaces and rear surfaces of the humidifier 10. Remaining portions of the opposite side surfaces and a front surface of the humidifier 10 may be provided to be covered by the front case 60 (refer to FIG. 2). On the opposite side surfaces of the humidifier 10, the front case 60 (refer to FIG. 2) and the rear cover 120 may be disposed to come into contact each other, and thus a natural appearance may be formed.

Referring to FIGS. 8 to 9, the sub frame 130 may be positioned below the lower frame 110 and may be configured to be coupled to the lower frame 110. Particularly, the sub frame 130 may include an outer flange 131 correspondingly coupled to the rear cover 120, an inner flange 132 formed more inside than the outer flange 131, and a bottom portion 133 provided to connect the inner flange 132 to outer flange 131.

The sub frame 130 may be formed in an overall shape in which a donut is cut in half. That is, due to the structure of the bottom portion 133 connecting the inner flange 132 to the outer flange 131, an empty space spaced apart between the inner flange 132 and the outer flange 131 may be provided. The inner flange 132, the outer flange 131, and the bottom portion 133 may form an arc along a circumference of the sub frame 130. This structure may increase the rigidity and durability of the sub frame 130 configured to support the entire humidifier 10. In addition, a plurality of wheels 134 may be disposed at each corner of the sub frame to improve mobility of the humidifier 10.

Referring to FIGS. 8 and 9, a fastening groove 112 may be formed in the lower frame 110 to allow the sub frame 130 to be coupled to the lower frame 110. A hook 113 correspondingly hooked to the fastening groove 112 may be formed in the inner flange 132. The hook 113 may be formed on the outer flange 131, but for aesthetic appearance, it is appropriate to form the hook 113 on the inner flange 132 that a user cannot see from the outside of the humidifier 10. In terms of functionality, in comparison with a state in which the hook 113 is formed on the outer flange 131, a state in which the hook 113 is formed on the inner flange 132 may have a less risk of damage, which is caused by external impact, and may form more stable coupling structure of the sub-frame 130 and the lower frame 110.

Figure 10:
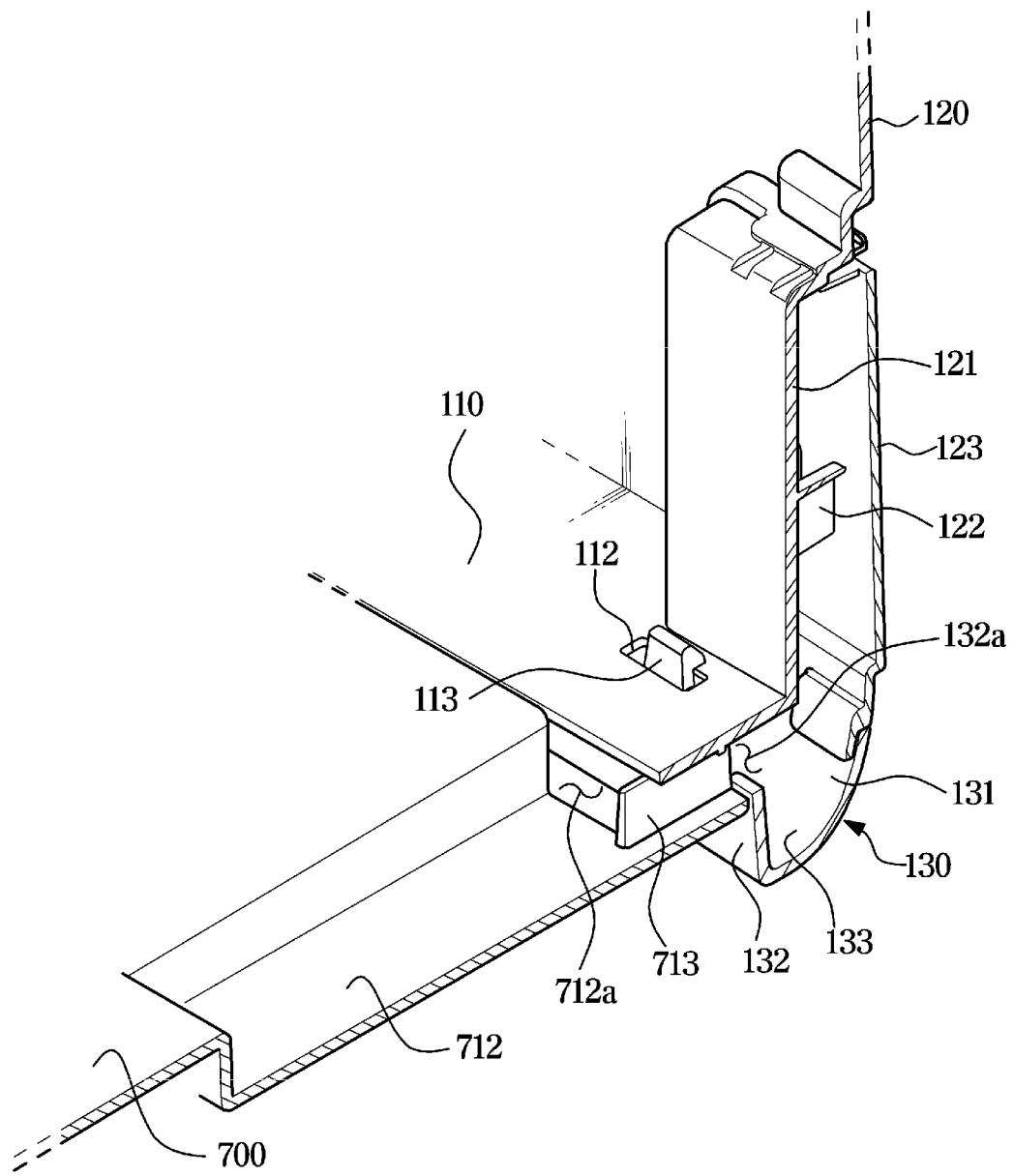
FIG. 10 is an enlarged perspective view of a part including a cross-section of FIG. 8.

Hereinafter the structure and arrangement relationship among the drain tube 526, and the humidifier lower cover 700 and the rear cover 120 will be described in detail with reference to FIGS. 9 and 10. FIG. 9 is a cross-sectional view taken along a line Y-Y' of FIG. 5. FIG. 10 is an enlarged perspective view of a part including a cross-section of FIG. 8.

The following description will be described along a direction in which the drain tube 526 extends from the drain groove 522, particularly the drain cylinder 525.

Figure 11:
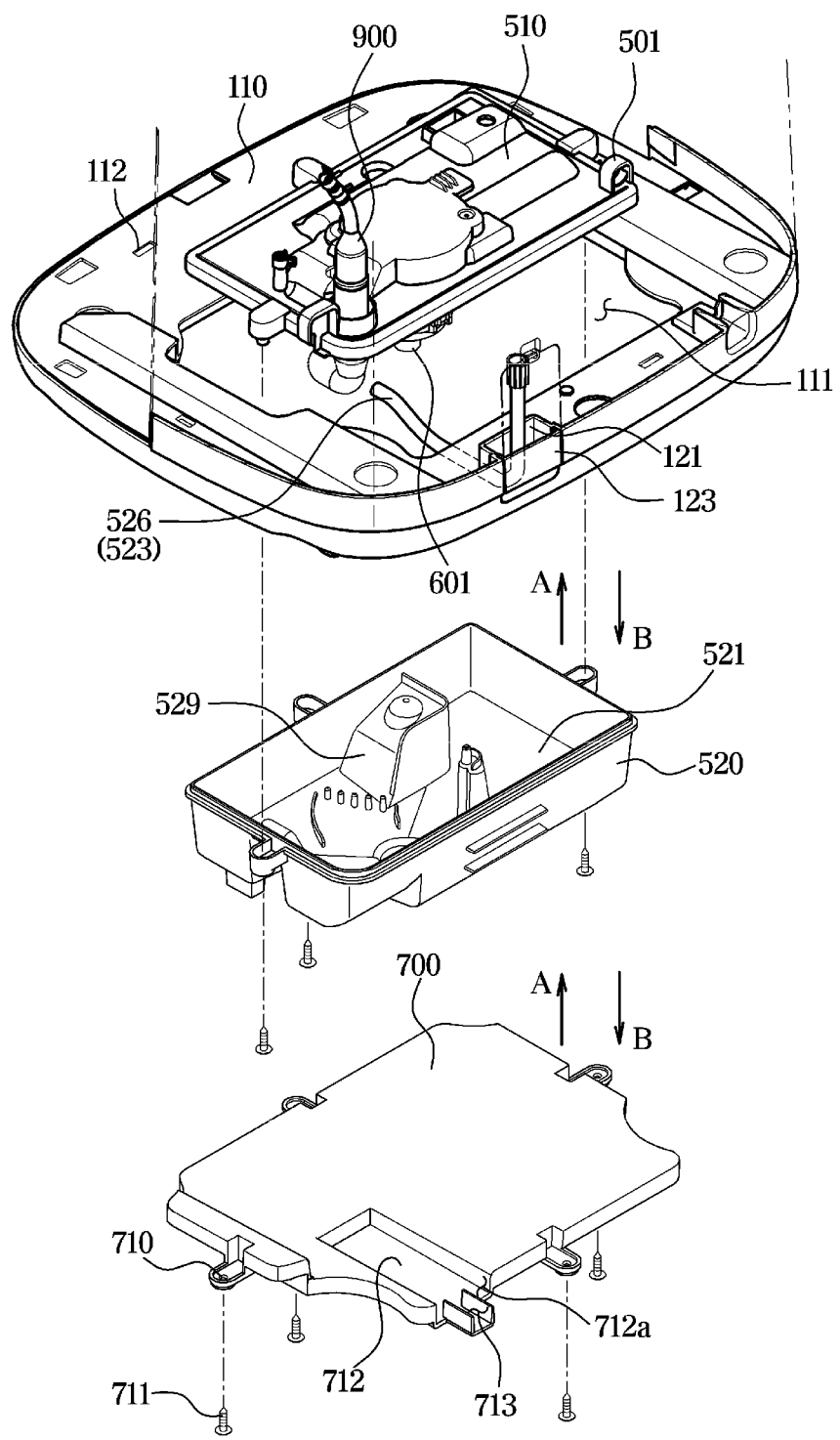
FIG. 11 is a view illustrating a process of separating the humidifier lower cover from a water collection tank lower cover according to an embodiment of the disclosure when viewed from the top with respect to a lower frame.
Figure 12:
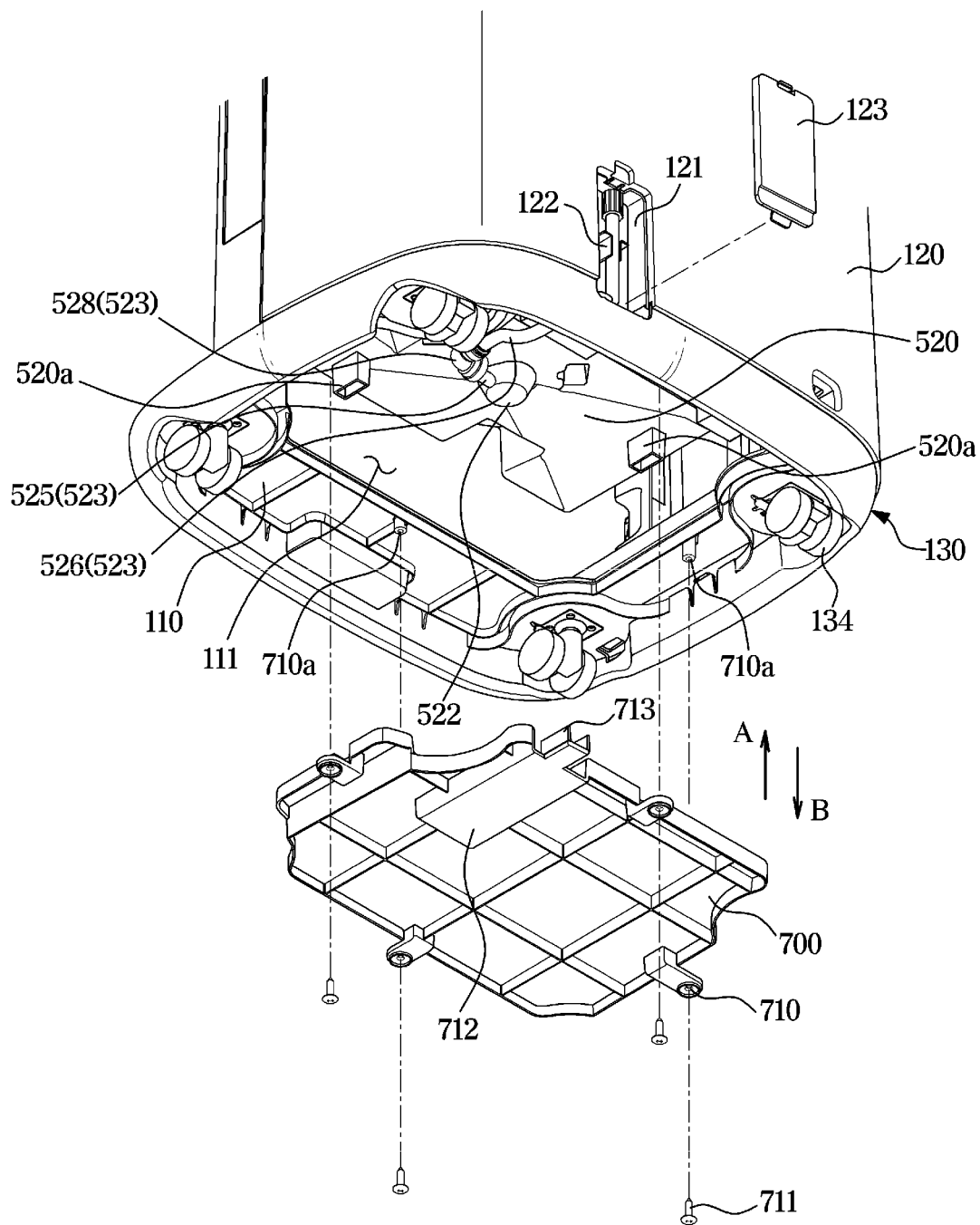
FIG. 12 is a view illustrating a process of separating the humidifier lower cover from the water collection tank lower cover according to an embodiment of the disclosure when viewed from the top with respect to the lower frame.

For cleaning and repairing the water collection tank 500, the water collection tank lower cover 520 may be disassembled and then separated from the water collection tank top cover 510 after separating the humidifier lower cover 700 (refer to FIGS. 11 and 12). In order to implement a series of separation structures, the humidifier lower cover 700 may includes a humidifier lower cover fastening portion 710, and the lower frame 110 may include a lower frame fastening portion 710a (refer to FIG. 12) provided at a position corresponding to the humidifier lower cover fastening portion 710. The humidifier lower cover fastening portion 710 and the lower frame fastening portion 710a may be fastened to each other through a fastening member 711.

Because the drain portion 523 allows the drain groove 522 to communicate with the outside of the water collection tank 500, the drainage cylinder 525, the drain tube 526, and the elbow 528 may be provided in a space between the water collection tank lower cover 520 and the humidifier lower cover 700. The humidifier lower cover 700 may be configured to lower an overall height of the humidifier 10 and minimize an empty space between the water collection tank lower cover 520 and the humidifier lower cover 700. Particularly, the humidifier lower cover 700 may be provided to correspond to a shape of the opening 111 formed in the lower frame 110. The humidifier lower cover 700 may include a lower cover recess 712 recessed downward of the humidifier 10 to accommodate the drain tube 526.

Referring to FIG. 6, a width of the lower cover recess 712 in the left and right direction may be formed to accommodate the elbow 528. Referring to FIG. 9, a depth of the lower cover recess 712 in the up and down direction may be formed to correspond to the height of a drain tube through hole 132a to be described later. In response to coupling the humidifier lower cover 700 to the lower frame 110, a part of the elbow 528 may be located in the recess, and the drain tube 526 connected from the elbow 528 may be bent and then enter the lower cover recess 712.

Referring to FIGS. 9 and 10, the humidifier lower cover 700 may further include an opening 712a provided on one side of the lower cover recess 712 and opened toward the drain tube through hole 132a, and a guide flange 713 protruding from the lower cover recess 712 and configured to guide the drain tube 526 to pass through the drain tube through hole 132a. The drain tube 526 may be formed of a silicone or rubber material having elasticity for easy drainage operation by a user. However, there may be a difficulty that the humidifier 10 is not fixed during operation. Therefore, the guide flange 713, which is configured to guide the drain tube 526 connected from the elbow 528 to be bent and to enter the lower cover recess 712 and then to stably pass through the drain tube through hole 132a, may be provided. The guide flange 713 may be formed in the lower cover recess 712 adjacent to the drain tube through hole 132a.

As the sub frame 130 and the lower frame 110 are coupled to each other, an upper end of the inner flange 132 and an upper end of the outer flange 131 may come into contact with the lower frame 110. Referring to FIG. 9, the inner flange 132 may include the drain tube through hole 132a formed at a position lower than the bottom portion 521 of the water collection tank 500.

Referring to FIG. 10, particularly, the fastening groove 112 may be formed in the lower frame 110, and the inner flange 132 may include the hook 113 correspondingly hooked to the fastening groove 112. As the fastening groove 112 is hooked to the hook 113, the sub frame 130 and the lower frame 110 may be coupled to each other.

The residual water, which is inevitably generated due to a separation distance between the pump inlet 601 and the drain groove 522, clogging of the circulation pipe 900, a malfunction of the controller (not shown) and the pump 600, the aging of the pump 600, may be discharged through the drain portion 523 that is the drain cylinder 525 and the drain tube 526. In order to effectively discharge the residual water through the drain portion 523, it may be required to form the drain tube 526 as an inclined structure. In order to create such an environment, a user may place the drain hole 526a of the drain tube 526 to a position lower than the height of the drain groove 522 from the ground, but it may be difficult for the user to manipulate the drain tube 526 placed in the inside of the main body.

Referring to FIGS. 9 and 10, in order to ease the difficulty, a structure in which, the upper end of the inner flange 132 and the upper end of the outer flange 131 come into contact with the lower frame 110 as the sub frame 130 is coupled to the lower frame 110, may be used. Particularly, the drain tube through hole 132a may be formed in the inner flange 132 corresponding to the lower cover recess 712. Because the inner flange 132 is coupled to a lower end of the sub frame 130, the drain tube through hole 132a may be formed at a position lower than the height of the drain groove 522 from the ground. The drain tube 526 connected from the elbow 528 may be bent and enter the lower cover recess 712 and then pass through the drain tube through hole 132a that is located at a position lower than the height of the drain groove 522 from the ground.

The rear cover 120 may include the rear cover recess 121 for a structure in which the drain tube 526, which passed through the through hole 132a, is exposed to the outside of the humidifier 10 or is accommodated therein. Particularly, the rear cover 120 may include the rear cover recess 121 provided in an area adjacent to the water collection tank 500 to be recessed toward the front. The rear cover recess 121 may include an opening at a lower end, as shown in FIGS. 9 and 10. Referring to FIG. 10, the opening formed at the lower end of the rear cover recess 121 may be provided to face between the outer flange 131 and the inner flange 132 of the sub-frame 130, that is, to face the bottom portion 133. The drain tube 526, which passed through the drain tube through hole 132a formed in the inner flange 132, may be bent in the space between the inner flange 132 and the outer flange 131. In other words, the opening 712a formed on one side of the lower cover recess 712, the drain tube through hole 132a formed in the inner flange 132, and the opening formed at the lower end of the rear cover recess 121 may be provided to communicate with each other. That is, the drain tube through hole 132a may be provided at a position corresponding to the rear cover recess 121 of the humidifier lower cover 700. The drain tube 526 connected from the elbow 528 may be exposed to the outside of the humidifier 10 through a communication structure.

In a situation in which water is not discharged to the outside through the drain tube 526, it may be required that the drain tube 526 is accommodated to prevent from being exposed to the outside. A user can manipulate the drain tube 526 to be seated in the rear cover recess 121 after bending the drain tube 526 in a direction, which is perpendicular to the ground, in the space between the inner flange 132 and the outer flange 131. In order to fix the drain tube 526 to the inside of the rear cover recess 121, the rear cover 120 may further include a fixing flange 122 protruding from the rear cover recess 121 and provided to correspond to a diameter of the drain tube 526 and to allow the drain tube 526 to be fitted and fixed. Thereafter, the user may arrange the drain tube 526 by coupling the recess cover 123, which is provided to cover the rear cover recess 121 so as to form an exterior of the humidifier 10, to the rear cover 120.

In the case of discharging water to the outside through the drain tube 526, the user may perform the above process in reverse so as to direct the drain tube 526 toward the ground to discharge the residual water.

Hereinafter a process in which the humidifier lower cover 700 and the water collection tank lower cover 520 are separated will be described in detail with reference to FIGS. 11 and 12. FIG. 11 is a view illustrating a process of separating the humidifier lower cover from the water collection tank lower cover according to an embodiment of the disclosure when viewed from the top with respect a lower frame. FIG. 12 is a view illustrating a process of separating the humidifier lower cover from the water collection tank lower cover according to an embodiment of the disclosure when viewed from the top with respect the lower frame.

In addition to the method of discharging water to the outside through the drain tube 526, the circulation pipe 900, the pump 600, and the water level sensor 800 disposed inside the water collection tank 500 may sometimes need to repair or replace. In this case, a user may proceed with repair or replacement by separating only the humidifier lower cover 700 and the water collection tank lower cover 520 without disassembling the front case 60 (refer to FIG. 2) and the main frame 50 (refer to FIG. 2).

Upon starting the repair or replacement, a user separates the humidifier lower cover in a direction B of FIG. 10 after disassembling the fastening member 711 configured to couple the humidifier lower cover fastening portion 710 to the lower frame fastening portion 710a. The user releases the connection between the elbow 528 and the drain cylinder 525, and releases the fastening member 711 configured to couple the water collection tank top cover 510 to the water collection tank lower cover 520, and then separate the water collection tank lower cover 520 in a direction B of FIG. 11. In response to the completion of the process, the water tank top cover 510, the circulation pipe 900, the pump 600, and the water level sensor 800 may be exposed toward the outside from the lower end of the humidifier 10, and thus the user can repair and replace the water tank top cover 510, the circulation pipe 900, the pump 600, and the water level sensor 800.

In a situation in which the repair or replacement is completed, the above process may be reversed (installation direction: direction A) to restore the humidifier 10 to its operating state.

As is apparent from the above description, without disassembling the front case and the main frame of the humidifier, the humidifier may clean and repair the water collection tank by including the humidifier lower cover detachable from the lower end of the humidifier.

Even if the humidifier lower cover and the water collection tank lower cover are separated, the humidifier may be easy to clean and repair the water collection tank by fixing devices arranged in the inside of the water collection tank, such as the pump, to the water collection tank top cover.

Other than a method of using the pump, the humidifier may effectively remove residual water of the water collection tank by forming the water drain portion, which uses the drain tube, on the drain groove of the water collection tank.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A humidifier comprising:
   a main body;
   a water supply tank provided in an upper portion of the main body;
   a humidifying fabric arranged in an inside of the main body and disposed below the water supply tank to receive water;
   a fan configured to move air through the humidifying fabric;
   a water collection tank configured to collect water from the humidifying fabric that remains of the water received by the humidifying fabric:
   a pump configured to pump the water collected from the water collection tank to the water supply tank; and
   a humidifier lower cover configured to be coupled to and decoupled from a lower end of the main body,
   wherein the water collection tank comprises:
   a water collection tank top cover provided in an upper portion of the water collection tank; and
   a water collection tank lower cover configured to be accessible through the lower end of the main body to thereby be coupled to and decoupled from the water collection tank top cover.

2. The humidifier of claim 1, wherein the water collection tank is provided in such a way that the pump is fixed to the water collection tank top cover.

3. The humidifier of claim 2, wherein
   the water collection tank is provided in such a way that a circulation pipe configured to supply the water from the pump to the water supply tank is fixed to the water collection tank top cover.

4. The humidifier of claim 1, wherein the main body comprises:
   a lower frame including an opening through which the water collection tank lower cover is accessible, the opening being provided at the lower end of the main body;
   a rear cover which extends along an edge of the lower frame and is configured to cover a portion of opposite side surfaces and a rear surface of the humidifier; and
   a sub frame located below the lower frame and configured to be coupled to the lower frame.

5. The humidifier of claim 4, wherein the sub frame comprises:
   an outer flange;
   an inner flange formed more inside than the outer flange from the rear cover; and
   a bottom portion configured to connect the inner flange to the outer flange.

6. The humidifier of claim 5, wherein
   a fastening groove is formed in the lower frame,
   wherein the inner flange comprises a hook configured to be correspondingly hooked to the fastening groove.

7. The humidifier of claim 4, wherein
   the humidifier lower cover comprises a humidifier lower cover fastening portion, and the lower frame comprises a lower frame fastening portion at a position corresponding to the humidifier lower cover fastening portion,
   wherein the humidifier lower cover fastening portion and the lower frame fastening portion are fastened to each other through a fastening member.

8. The humidifier of claim 5, wherein the water collection tank further comprises:
   a drain groove provided in a bottom portion of the water collection tank lower cover; and
   a drain portion connected to the drain groove.

9. The humidifier of claim 8, wherein
   the water collection tank lower cover further comprises an inclined portion formed such that the bottom portion is inclined toward the drain groove, and
   the drain portion further comprises:
   a drain cylinder configured to connect to the drain groove; and
   a drain tube connected to the drain cylinder.

10. The humidifier of claim 9, wherein the rear cover comprises:
    a rear cover recess provided in an area adjacent to the water collection tank and recessed toward a front of the humidifier,
    wherein the drain tube is bent and seated in the rear cover recess.

11. The humidifier of claim 10, wherein
    the inner flange comprises a drain tube through hole formed at a position lower than the bottom portion of the water collection tank.

12. The humidifier of claim 11, wherein
the position of the drain tube through hole is provided in a position corresponding to the rear cover recess of the humidifier lower cover.

13. The humidifier of claim 10, wherein
the rear cover further comprises a fixing flange protruding from the rear cover recess and configured to correspond to a diameter of the drain tube to allow the drain tube to be fitted and fixed.

14. The humidifier of claim 9, wherein
the drain portion further comprises a drain cap configured to be fitted and coupled to a drain port of the drain tube.

15. The humidifier of claim 9, wherein
the drain portion comprises an elbow coupleable and decoupleable from to the drain cylinder and the drain tube, respectively, and configured to change a flow direction of water flowing out from the drain cylinder.

16. The humidifier of claim 10, further comprising:
a recess cover configured to cover the rear cover recess and provided to form the rear cover and an exterior of the humidifier.

17. The humidifier of claim 9, wherein
the humidifier lower cover is provided to correspond to a shape of the opening of the lower frame, and the humidifier lower cover comprises a lower cover recess recessed downward of the humidifier to accommodate the drain tube.

18. The humidifier of claim 11, wherein
the humidifier lower cover further comprises an opening provided on one side of the lower cover recess and opened toward the drain tube through hole, and a guide flange provided to protrude from the lower cover recess and configured to guide the drain tube to pass through the drain tube through hole.

19. The humidifier of claim 1, wherein
the water collection tank lower cover comprises a water collection tank lower cover support provided in an area facing the humidifier lower cover,
wherein the water collection tank lower cover support is supported by the humidifier lower cover in response to coupling the humidifier lower cover to the main body.

20. The humidifier of claim 1, wherein
a water collection tank cover fastening groove is provided in the water collection tank top cover,
the humidifier further comprises:
a main frame fixed to the main body, the fan and the humidifying fabric being arranged on the main frame, and the main frame comprising a fixing groove configured to correspond to the water collection tank cover fastening groove,
wherein the water collection tank cover fastening groove and the fixing groove are fastened to each other through a fastening member.

21. A humidifier comprising:
a water supply tank;
a humidifying fabric configured to receive water from the water supply tank;
a fan configured to forcedly move air to pass through the humidifying fabric;
a water collection tank configured to collect water from the humidifying fabric that remains of the water received by the humidifying fabric;
a pump configured to pump the water collected from the water collection tank to the water supply tank; and
a humidifier lower cover provided below the water collection tank,
wherein the water collection tank comprises:
a drain groove provided with a drain cylinder configured to connect to the water collection tank, the drain groove being formed at a lowest position of an inclined bottom portion of the water collection tank; and
a drain tube connected to the drain cylinder to discharge the water collected in the water collection tank to an outside of the water collection tank,
wherein a pump inlet of the pump is disposed in an inside of the drain groove,
a lower frame including an opening and provided below the water collection tank;
a rear cover which extends along an edge of the lower frame and is configured to cover a portion of opposite side surfaces and a rear surface of the humidifier; and
a sub frame located below a cover frame and configured to be coupled to the lower frame,
wherein the humidifier lower cover is detachable from the lower frame and formed to have a shape corresponding to the opening.

22. The humidifier of claim 21, wherein the rear cover comprises:
a rear cover recess provided in an area adjacent to the water collection tank and recessed toward a front of the humidifier,
wherein the drain tube is bent and seated in the rear cover recess.

23. The humidifier of claim 21, wherein the sub frame comprises
an outer flange;
an inner flange formed more inside than the outer flange from the rear cover; and
a bottom portion configured to connect the inner flange to the outer flange,
wherein the inner flange comprises a drain tube through hole formed at a position lower than the bottom portion of the water collection tank,
wherein the position of the drain tube through hole is provided in a position corresponding to the rear cover recess of the humidifier lower cover.

* * * * *